3,420,902
PROCESS FOR THE HYDROHALOGENATION
OF ORGANIC COMPOUNDS
Danford H. Olson, Wood River, Ill., and George M.
Bailey, Littleton, Colo., assignors to Marathon Oil
Company, Findlay, Ohio, a corporation of Ohio
No Drawing. Filed Aug. 1, 1966, Ser. No. 569,102
U.S. Cl. 260—663     13 Claims
Int. Cl. C07c 17/08

ABSTRACT OF THE DISCLOSURE

The present invention comprises a process for the production of organic halides comprising in combination the steps of contacting a hydrogen halide with an organic compound containing at least one non aromatic double bond in the presence of a catalytic amount of noble metal.

The present invention relates to new methods for the preparation of halogenated organic compounds, and in particular relates to methods for the preparation of such compounds by the reaction of organic compounds containing at least one non-aromatic double bond with hydrogen halides in the presence of catalytic amounts of noble metals.

As used herein the term "noble metals" includes the traditional noble metals of Groups 8 and Ib of the Periodic Table which are solid at room temperature (Ru, Rh, Pd, Ag, Os, Ir, Pt and Au) together with nickel which is closely related to the preferred platinum and palladium and which, for purposes of the present invention, behaves like one of the above named noble metals. Mercury is not included within the term "noble metal" as used herein. The preferred noble metals are those of Groups 8 and Ib having molecular weight of from 58 to 197 inclusive with platinum, palladium and ruthenium being more preferred, and platinum being the most preferred metal.

A major advantage over previous catalysts lies in the inertness of the catalysts of the present invention to water. Many of the previous catalysts used for liquid or vapor phase hydrohalogenations were of the Friedel-Crafts type, e.g. $AlCl_3$, $ZnCl_2$, $FeCl_3$, which are known to be sensitive to water. Also, some of these catalysts require the addition of promoters such as $CuCl_2$, $LiCl$, $MgCl_2$, or $CaCl_2$. The catalysts of the present invention, not being sensitive to water, permit the use of commercial ethylene and hydrogen chloride which do not need to be anhydrous, thereby eliminating the relatively expensive step of drying of reactants in most instances.

The noble metal catalysts, for the purposes of the present invention, are preferably produced by dispersing the noble metal on the surface of a relatively high surface area support material capable of withstanding the conditions of the reaction of the invention. Preferred support materials include those comprising a major portion of silica gel, activated carbon, alumina and molecular sieves, with alumina being most preferred. Conventional techniques for the deposition of the noble metals on the surface of the catalyst support material may be employed, including, for example, the conversion of the noble metals to salts, e.g. chloroplatinic acid, which are thereafter deposited on the supports and reduced to the free metal. While such acidic type support materials as alumina may themselves be capable of enhancing some of the reactions of the present invention, comparative runs have demonstrated that the presence of the noble metal further enhances both the conversion and selectively of the reaction, even where such particularly desirable support materials are employed.

The hydrogen halides for use with the present invention are HI, HBr, HF and HCl; HCl being most preferred.

The organic compounds for use with the invention are those which contain at least one non aromatic double bond with those in which the unsaturation consists of only a single non aromatic double bond being most preferred. The non aromatic double bond-containing organic compounds for use as reactants with the present invention, can contain from 2 to 20 carbon atoms with $C_2$ to $C_4$ being more preferred and ethylene being most preferred, can be straight chain or branched or cyclic, and can have either a terminal or non-terminal double bond or both.

While not particularly preferred, the presence of aromatic groups in the molecules of the organic compound containing the non-aromatic double bond does not preclude the practice of the present invention.

While not narrowly critical, the moles of hydrogen halide per mole of unsaturation to be reacted in the organic compound, will generally be from about 0.1 to about 10, with 0.5 to 2.0 being preferred in most instances.

While it may be desirable in some cases to conduct the reaction in the liquid phase, the vapor phase will be substantially preferred for most applications of the present invention. Reactants will generally be preheated to vaporize them and the vaporized materials conducted to a reaction zone where they are intimately contacted with the above described noble metal catalyst of the present invention for a time sufficient to cause their reaction. Reaction time is not narrowly critical and will, in most instances, be optimized by conducting routine trial runs. Conversion per pass is substantially enhanced by the present invention, but may be reduced somewhat below the maximum conversion attainable in order to prevent the formation of undesirable by-products. Conversions will thus be balanced against ultimate multi-pass yields for maximum overall economy according to conventional principles.

In general, contact times will vary from about 1 second to about 300 seconds, preferably from about 5 seconds to about 125 seconds, and more preferably from about 15 seconds to about 75 seconds. However, it should be understood that these contact times are not narrowly critical and that under certain circumstances other contact times may be utilized with the present invention.

In a preferred embodiment of the present invention utilizing ethylene as the principal feed material, together with HCl as the hydrogen halide and the preferred platinum on alumina catalyst, the reactants are first vaporized and then mixed together before passing into the reaction zone at 1 atmosphere which comprises a non-fluidized packed bed of ⅛" alumina pellets deposited with 0.5% by weight of platinum. Feed rates of from about 15 to 200 cc. per minute are utilized where the catalyst charge of about 50 grams substantially fills the reaction zone and temperatures are in the preferred range of from 300 to 450° C. The product, primarily ethyl chloride, is separated from unreacted ethylene by partial condensation. The unreacted ethylene may then be recycled for further reaction.

Many variations on the above may be made by the employment of conventional techniques. For example, the catalyst bed can be fluidized if desirable, or the catalyst material may be shaped into rings or special high surface shapes. The reaction may be conducted on a batch basis, but in most cases, the continuous process will be preferred.

While not narrowly critical, temperature will generally be from about 50 to about 650° C. with temperatures of from about 300 to 450° C. being more preferred, and temperatures of from about 375 to 425° C. being most preferred. The above stated temperature ranges are those for ethylene, the most preferred reactant for the present invention. While these are exemplary of the preferred ranges for other reactants, optimum ranges can preferably be determined by routine trial runs.

Pressure is not especially critical in the present invention and will generally be from 0.1 to 10,000 atmospheres absolute, with pressures of from 0.5 to 50 atmospheres being more preferred and from about 0.8 to about 10.0 atmospheres absolute being most preferred.

The following examples will serve to illustrate the invention with the hydrocarbons, ethylene, styrene and 1-eicosene, but it should be understood that the invention is susceptible to a wide variety of variations and modifications which will be apparent to those skilled in the art upon a reading of the present specification and all such variations and modifications are to be taken as being included within the scope of the claims appended hereto. Conversions in the following examples are volume percent of ethylene unless otherwise specified.

EXAMPLE I

Using the above described packed bed flow type reactor with ethylene and HCl a series of runs was made over 0.5% Pt deposited on alumina (obtained from Engelhard Industries) and present in the form of 50 grams of approximately 1/8" diameter pellets. Temperatures, flow rates, conversions and selectivities were as shown in Table 1.

TABLE 1.—ADDITION OF HCl TO ETHYLENE WITH 0.5 WEIGHT PERCENT Pt-Al$_2$O$_3$ CATALYST*
[At 1 atmosphere]

| Temp., °C. | Flow Rates, cc./min. at 25° C. | | Conversion to C$_2$H$_5$Cl, percent | Selectivity to C$_2$H$_5$Cl, percent |
| --- | --- | --- | --- | --- |
| | Ethylene | HCl | | |
| 350 | 20 | 40 | 45.1 | 97.4 |
| 375 | 20 | 40 | 43.2 | 97.5 |
| 400 | 100 | 100 | 23.1 | 100.0 |
| 400 | 20 | 40 | 50.8 | 98.4 |
| 400 | 70 | 40 | 20.3 | 97.6 |
| 475 | 40 | 40 | 16.1 | 84.5 |
| 475 | 80 | 40 | 12.5 | 90.9 |
| 475 | 20 | 40 | 30.5 | 93.3 |

* Engelhard Industries, Newark, N.J. Described in brochure E. I. 6158.

EXAMPLE II

Using the above described experimental set-up, ethylene and HCl are fed at 20 cc. and 40 cc. per minute (measured at 25° C. and 1 atmosphere) respectively, at 400° C. over the catalysts shown in Table 2 with results as shown in the table. The last run of Table 2 utilizes silica alumina without a noble metal in order to provide a comparison to demonstrate the improved selectivities obtained by the present invention.

TABLE 2.—EFFECT OF CATALYST ON ADDITON OF HCl TO ETHYLENE AT 400° C.

| Catalyst | Conversion to C$_2$H$_5$Cl, percent | Selectivity to C$_2$H$_5$Cl, percent |
| --- | --- | --- |
| 0.5% Pd-Al$_2$O$_3$ a | 15.3 | 97.0 |
| 5.0% Pt-C a | 4.1 | 100.0 |
| 0.5% Pt-SiO$_2$-Al$_2$O$_3$ a | 7.8 | 73.1 |
| 0.5% Rh-Al$_2$O$_3$ a | 15.5 | 89.5 |
| SiO$_2$-Al$_2$O$_3$ b | 19.2 | 61.6 | a Engelhard Industries, Newark, N.J. Described in brochure E. I 6158.
b Davison Chemical Co. catalyst, 86.8% SiO$_2$ and 13.0% Al$_2$O$_3$. Grade F-1.

EXAMPLE III

Using the apparatus of Example II with flow rates of ethylene and HCl at 40 cc. and 20 cc. per minute (measured at 25° C. and 1 atmosphere) respectively, the results of Table 3 are obtained:

TABLE 3.—EFFECT OF CATALYST ON ADDITION OF HCl TO ETHYLENE AT 400° C.

| Catalyst | Conversion to C$_2$H$_5$Cl, percent | Selectivity to C$_2$H$_5$Cl, percent |
| --- | --- | --- |
| 0.2% Pd-C a | 2.8 | 100.0 |
| 0.5% Ru-Al$_2$O$_3$ a | 24.3 | 82.8 |
| 5% Pd-Al$_2$O$_3$ a | 13.3 | 82.0 | a Engelhard Industries, Newark, N.J. Described in brochure E. I. 6158.

EXAMPLE IV

For purposes of comparison, runs are made using the apparatus of Example I substituting commercial grade alumina (Harshaw Chemical Co., surface area 180–200 square meters/gram) in same quantity and same particle size. At a reaction temperature of 400° C. with HCl flow of 40 cc. per minute and ethylene flow of 20 cc. per minute, the following products are obtained:

| | Percent by volume |
| --- | --- |
| Ethylchloride | 24.01 |
| Isobutane | 8.14 |
| 2-butene | 1.47 |
| Unidentified | 6.64 |

This run indicates a selectivity of only about 59.6% as compared with the higher selectivities achieved by the process of the present invention.

EXAMPLE V

When styrene is conducted into the reaction zone with approximately stoichiometric quantities of HCl using the apparatus, procedures and catalysts of Example I, alpha chloroethylbenzene is produced, when the temperature in the reaction zone is maintained at approximately 100° C. in order to prevent decomposition of the product. A volume of nitrogen approximately equal to that of the reactants is fed into the reaction zone in order to minimize condensation of the reactants and products, and prevent liquid accumulation from decreasing the activity of the catalysts.

EXAMPLE VI

According to the procedures of Example I 1-eicosene and twice the stoichiometric amount of HCl are fed to the reactor with a volume of nitrogen equal to the volume of the reactants. The temperature in the reaction zone is approximately 400° C. and the pressure is approximately one atmosphere. 2-chloroeicosane is produced at higher conversions than those obtained when the catalyst is replaced with pure alumina.

What is claimed is:

1. A process for the production of organic halides consisting essentially of, for about 1 to about 300 seconds at from about 50 to about 650° C., contacting a hydrogen halide with a hydrocarbon containing 2 to 20 carbon atoms and containing at least one non aromatic double bond in the presence of a catalytic amount of metal selected from the group consisting of Ru, Rh, Pd, Ag, Os, Ir, Pt, Au, and Ni.

2. The process of claim 1 wherein the metal is dispersed on a high surface area catalyst support material.

3. The process of claim 1 wherein the hydrogen halide and the organic compound are in the vapor phase.

4. The process of claim 1 wherein the hydrogen halide consists of hydrogen chloride.

5. The process of claim 2 wherein the hydrogen halide consists of hydrogen chloride.

6. The process of claim 3 wherein the hydrogen halide consists of hydrogen chloride.

7. The process of claim 2 wherein the metal consists of platinum.

8. The process of claim 2 wherein the metal consists of palladium.

9. The process of claim 2 wherein the metal consists of ruthenium.

10. The process of claim 7 wherein the support material is selected from the group of support materials consisting of alumina, carbon, silica gel and molecular sieves.

11. The process of claim 1 wherein the support material is selected from the group of support materials consisting of alumina, carbon, silica gel and molecular sieves.

12. The process of claim 1 wherein the catalyst consists of platinum supported on alumina.

13. The process of claim 1 wherein the hydrogen halide consists of hydrogen chloride and the organic compound containing the double bond consists of ethylene.

(References on following page)

References Cited

UNITED STATES PATENTS

| | | | |
|---|---|---|---|
| 2,573,695 | 11/1951 | Dolnick et al. | 260—651 XR |
| 2,838,578 | 6/1958 | Conrad et al. | 260—663 XR |
| 2,905,727 | 9/1959 | Neher et al. | 260—663 XR |
| 2,906,781 | 9/1959 | Montgomery | 260—651 |
| 3,287,411 | 11/1966 | Wakeman et al. | 260—663 XR |
| 3,345,421 | 10/1967 | Brown | 260—663 |

FOREIGN PATENTS

| | | |
|---|---|---|
| 6,411,608 | 4/1965 | Netherlands. |
| 6,504,213 | 10/1965 | Netherlands. |

LEON ZITVER, *Primary Examiner.*

H. MARS, *Assistant Examiner.*

U.S. Cl. X.R.

260—651, 653.6, 648